United States Patent
Reed et al.

(10) Patent No.: US 9,612,618 B2
(45) Date of Patent: *Apr. 4, 2017

(54) APPARATUS AND METHOD FOR ASSEMBLING DISPLAY OF INDICIA READING TERMINAL

(71) Applicant: Hand Held Products, Inc., Fort Mill, SC (US)

(72) Inventors: Sherri Reed, Charlotte, NC (US); Eric Linn, Fort Mill, SC (US); Timothy R. Fitch, Syracuse, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,444

(22) Filed: Oct. 9, 2015

(65) Prior Publication Data

US 2016/0033998 A1 Feb. 4, 2016

Related U.S. Application Data

(63) Continuation of application No. 13/169,702, filed on Jun. 27, 2011, now Pat. No. 9,158,340.

(51) Int. Cl.
*H05K 1/00* (2006.01)
*G06F 1/16* (2006.01)
*G06F 1/18* (2006.01)

(52) U.S. Cl.
CPC .......... *G06F 1/1637* (2013.01); *G06F 1/1626* (2013.01); *G06F 1/1656* (2013.01); *Y10T 29/49826* (2015.01)

(58) Field of Classification Search
CPC ...... G06F 1/1656; G06F 1/181; G06F 1/1637; G06F 1/1626
USPC ......... 361/679.02, 679.26, 679.3; 174/50.51, 174/520; 277/637
See application file for complete search history.

(56) References Cited

U.S. PATENT DOCUMENTS

| | | | |
|---|---|---|---|
| 4,515,440 A | 5/1985 | Mosier | |
| 4,545,647 A | 10/1985 | Sasaki et al. | |
| 4,639,062 A | 1/1987 | Taniguchi et al. | |
| 4,878,738 A | 11/1989 | Hanami | |
| 5,002,368 A | 3/1991 | Anglin | |
| 5,196,993 A | 3/1993 | Herron et al. | |
| 5,363,227 A | 11/1994 | Ichikawa et al. | |

(Continued)

*Primary Examiner* — Nathan Milakovich
(74) *Attorney, Agent, or Firm* — Additon, Higgins & Pendleton, P.A.

(57) ABSTRACT

An apparatus and method for sealing a joint between a display and a housing of a hand held computer terminal is provided. The apparatus comprises a display frame. The display frame comprises display a front, a display back, and display sides. The front of the display frame comprises a recessed portion and a non-recessed portion. The recessed portion is configured to accept insertion of the display. The non-recessed portion defines at least a portion of the perimeter of the recessed portion. Fastening holes can be positioned outside the perimeter of the recessed portion. The display frame is configured to tighten to the housing and to compress the display between the display frame and the housing. The method comprises providing a display frame, assembling a display assembly, inserting the display assembly into the housing, and compressing the display between the display frame and the housing.

20 Claims, 5 Drawing Sheets

(56) References Cited

U.S. PATENT DOCUMENTS

| | | |
|---|---|---|
| 5,486,942 A | 1/1996 | Ichikawa et al. |
| 5,929,950 A | 7/1999 | Matsuda |
| 5,963,421 A | 10/1999 | Moss et al. |
| 5,999,238 A | 12/1999 | Ihara |
| 6,002,582 A | 12/1999 | Yeager et al. |
| 6,094,340 A | 7/2000 | Min |
| 6,144,552 A | 11/2000 | Whitcher et al. |
| 6,151,207 A | 11/2000 | Kim |
| 6,154,261 A | 11/2000 | Shim |
| 6,163,350 A | 12/2000 | Ihara |
| 6,219,116 B1 | 4/2001 | Yuuki et al. |
| 6,243,147 B1 | 6/2001 | Sano |
| 6,307,603 B1 | 10/2001 | Menard et al. |
| 6,330,045 B1 | 12/2001 | Tanaka |
| 6,411,352 B1 | 6/2002 | Kim |
| 6,428,176 B1 | 8/2002 | Nelson |
| 6,483,719 B1 | 11/2002 | Bachman |
| 6,532,152 B1 | 3/2003 | White et al. |
| 6,594,143 B2 | 7/2003 | Yano et al. |
| 6,619,800 B1 | 9/2003 | Takezawa et al. |
| 6,731,354 B2 | 5/2004 | Menard |
| 6,838,810 B1 | 1/2005 | Bovio et al. |
| 6,856,362 B2 | 2/2005 | Sasuga et al. |
| 7,170,741 B2 | 1/2007 | Cho et al. |
| 7,256,355 B2 | 8/2007 | Tempelman et al. |
| 7,262,822 B2 | 8/2007 | Sasuga et al. |
| 7,301,761 B2 | 11/2007 | Merz et al. |
| 7,310,222 B2 | 12/2007 | Bovio et al. |
| 7,359,024 B2 | 4/2008 | Sasuga et al. |
| 7,453,192 B2 | 11/2008 | Lee |
| 7,457,111 B2 | 11/2008 | Merz et al. |
| 7,492,421 B1 | 2/2009 | Kim et al. |
| 7,663,871 B2 | 2/2010 | Cho et al. |
| 7,733,642 B2 | 6/2010 | Liou et al. |
| 7,764,933 B2 | 7/2010 | Tempelman et al. |
| 7,828,616 B2 | 11/2010 | Kim et al. |
| 7,835,147 B2 | 11/2010 | Merz et al. |
| 7,864,138 B2 | 1/2011 | Kim et al. |
| 7,885,059 B2 | 2/2011 | Kim et al. |
| 7,907,399 B2 | 3/2011 | Kim et al. |
| 7,911,775 B2 | 3/2011 | Azami |
| 7,953,436 B2 | 5/2011 | Ladouceur |
| 8,199,489 B2 | 6/2012 | Mangaroo et al. |
| 8,787,009 B2 | 7/2014 | Wilson et al. |
| 9,158,340 B2 * | 10/2015 | Reed .................. G06F 1/1637 |
| 2001/0035931 A1 | 11/2001 | Kumagai et al. |
| 2003/0193283 A1 | 10/2003 | Aoki |
| 2005/0139498 A1 | 6/2005 | Gorros |
| 2008/0094786 A1 | 4/2008 | Liou et al. |
| 2008/0316687 A1 | 12/2008 | Richardson et al. |
| 2009/0080153 A1 | 3/2009 | Richardson et al. |
| 2010/0203850 A1 | 8/2010 | Norris et al. |

\* cited by examiner

APPARATUS AND METHOD FOR ASSEMBLING DISPLAY OF INDICIA READING TERMINAL

CROSS-REFERENCE TO RELATED APPLICATION

The present application claims the benefit of U.S. patent application Ser. No. 13/169,702 for an Apparatus and Method for Assembling Display of Indicia Reading Terminal filed Jun. 27, 2011 (and published Dec. 27, 2012 as U.S. Patent Application Publication No. 2012/0326397), now U.S. Pat. No. 9,158,340. Each of the foregoing patent application, patent publication, and patent is hereby incorporated by reference in its entirety.

FIELD OF THE INVENTION

The present invention relates to a hand held computer terminal in general and specifically to an apparatus and method for assembling a display of a hand held computer terminal.

BACKGROUND

The computing power of hand held computer terminals can be used for a variety of purposes. Indicia reading terminals, for example, have been used for a number of years in industrial data collection applications and for purposes of decoding information encoded in bar code symbols. Many hand held computer terminals, such as indicia reading terminals, are multifunctional and/or have broad computing capabilities. To assist a user in utilizing and controlling the various functions, many hand held computer terminals have a user interface that comprises a display, such as but not limited to a liquid crystal display ("LCD") or an organic light emitting diode ("OLED"). The display is assembled with a housing to enclose electronic components that facilitate the computing capability of the hand held computer terminal.

The electronic components can be damaged by external pollutants, such as water, dirt, dust, or other debris. When water ingresses the housing, the water is likely to cause electrical shorts, corrosion, or other damage. Electrical shorts can cause temporary or permanent malfunctions. Corrosion and other physical damage can also cause permanent malfunctions. Likewise, while sometimes less intrusive, dirt, dust, or other debris can be problematic, causing severe damage or a nuisance, such as an obscurity of the display.

The assembly of the display with the housing creates a joint where pollutants can potentially ingress. Some indicia reading terminals, for example, have a clamshell-styled housing, wherein the joint is sealed through compression of the display between two separate pieces of the housing. These two pieces of the housing are a front piece and a back piece. The display is arranged between the front piece and the back piece of the housing, and then compressed between the front piece and the back piece by tightening, e.g. by screwing, the front piece to the back piece.

Unfortunately, in hand held computer terminals with housings that do not have a clamshell style, such as with housings having a closed, periphery tube structure, the displays do not have a front piece of the housing separate and connectable to a back piece of the housing. The display can not be compressed between a front piece and a back piece, therefore, and the display can exhibit inferior sealing performance.

It would be useful to have a hand held computer terminal, such as an indicia reading terminal, without a front piece of the housing separate and connectable to a back piece of the housing, while still providing an equally strong seal or a seal superior to non-clamshell designs, at the joint between the display and the housing, thereby reducing the ingress of potentially damaging pollutants such as water, dirt, dust, or other debris.

SUMMARY

An apparatus and method for sealing a joint between a display and a housing of a hand held computer terminal are disclosed. In one embodiment, the apparatus for sealing a joint between a display and a housing of a hand held computer terminal comprises a display boot and a display frame. The display boot is configured to be assembled with the display, wherein at least a portion of the display boot mates with at least a portion of the front of the display when the display boot is assembled with the display. The display frame comprises a recessed portion, a non-recessed portion, and fastening holes. The recessed portion is configured to accept insertion of the display and the display boot. The non-recessed portion defines at least a portion of the perimeter of the recessed portion. The fastening holes are positioned outside the perimeter of the recessed portion. The display boot comprises an overhanging portion configured to overlap and mate against the non-recessed portion of the display frame when the display boot is assembled with the display frame. The display frame is configured to tighten to the housing using the fastening holes to compress the display and the display boot between the display frame and the housing, to compress the overhanging portion of the display boot between the non-recessed portion of the display frame and the housing, and to compress the display and the at least a portion of the display boot mating with the at least a portion of the front of the display between the display frame and the housing.

In another embodiment, an apparatus for sealing a joint between a display and a housing of a hand held computer terminal comprises a display frame. The display frame comprises a front, a back, and sides. The front of the display frame comprises a recessed portion, a non-recessed portion, and fastening holes. The recessed portion is configured to accept insertion of the display. The non-recessed portion defines at least a portion of the perimeter of the recessed portion. The fastening holes are positioned outside the perimeter of the recessed portion. The display frame is configured to tighten to the housing and to compress the display between the display frame and the housing using the fastening holes.

In another embodiment, a method of assembling a display and a housing of a hand held computer terminal comprises providing a display frame, assembling a display assembly, inserting the display assembly into the housing, and compressing the display between the display frame and the housing. Assembling the display assembly comprises inserting the display into the recessed portion of the display frame.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

Figure 1:
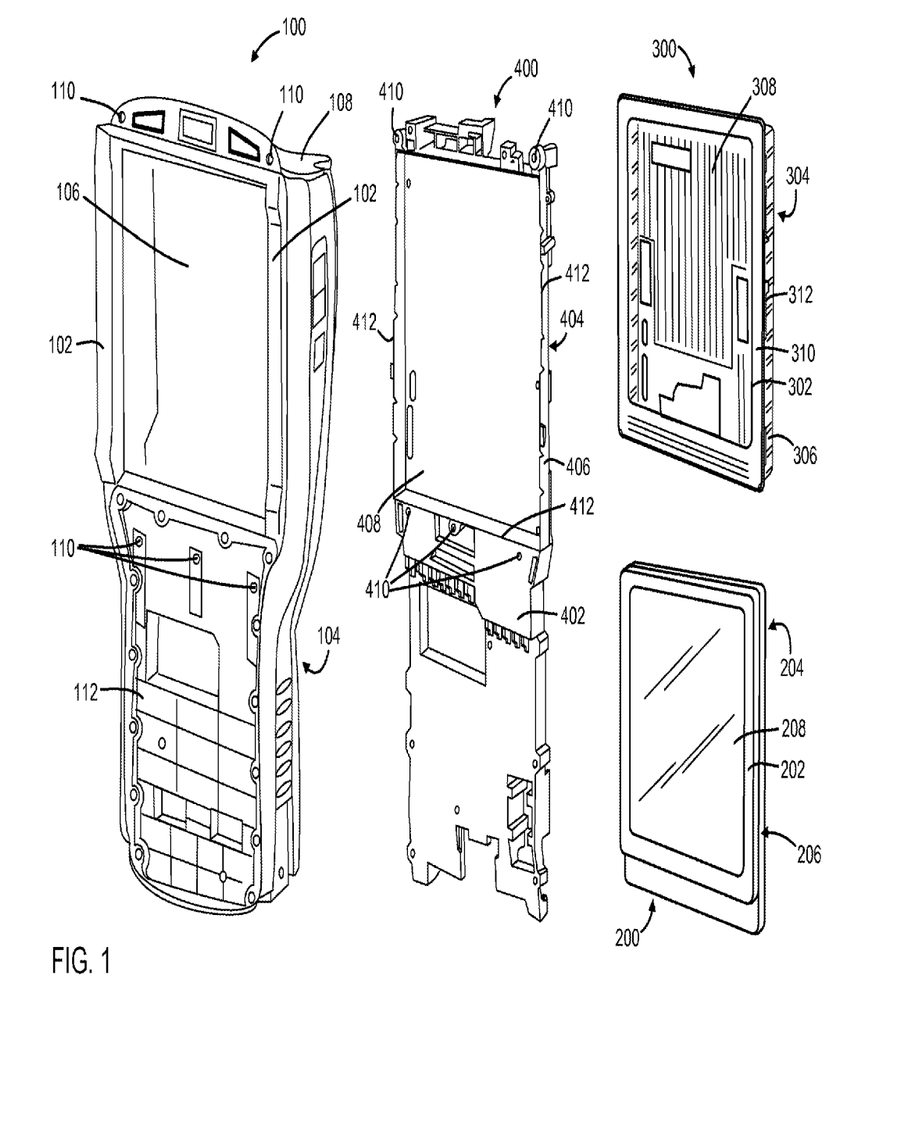
FIG. 1 is an exemplary isometric representation of a housing, a display, a display boot, and a display frame of a hand held computer terminal in an unassembled state, in one embodiment.

FIG. 1 is an exemplary representation of a housing 100, a display 200, a display boot 300, and a display frame 400 of a hand held computer terminal in an unassembled state. The unassembled hand held computer terminal components illustrated in FIG. 1 are components of an image sensor based indicia reading terminal. This indicia reading terminal of FIG. 1 is exemplified herein throughout to illustrate and describe the apparatus and method of sealing the joint between the display and the housing of a hand held computer terminal. One of ordinary skill in the art would recognize alternative types of hand held computer terminals with non-clamshell-style housings for which the herein described apparatus and method would apply.

Referring to FIG. 1, the housing 100 has a tube structure wherein a housing front 102 and a housing back 104 are one continuous piece. The housing 100 defines a display opening 106 for positioning of the display 200. The housing 100 can also define other openings, such as a top opening 108 for accessing the interior of the housing 100, and other openings for extension of buttons, keys, and other features through the housing 100. The top opening 108 can be covered with a cap (not shown).

The housing 100 comprises structural features that facilitate the ability to compress the housing front 102 of the housing 100 with the display frame 400. In the illustrated embodiment, for example, the housing front 102 of the housing 100 defines at least one housing hole 110 for fastening the display frame 400 to the housing front 102 of the housing 100 using fasteners, such as but not limited to screws. In the illustrated embodiment, there are five housing holes 110—one located in each top corner around the periphery of the display opening 106, and three spaced across the housing front 102 of the housing 100 below the display opening 106. The three housing holes 110 positioned across the housing front 102 of the housing 100 are on an opposite side of the display opening 106 from the two housing holes 110 located in the top corners around the periphery of the display opening 106. The two housing holes 110 located in each top corner around the periphery of the display opening 106 can be concealed by a cover or by the cap (not shown) when the cap (not shown) is assembled to cover the top opening 108 of the housing 100. The three housing holes 110 positioned across the housing front 102 of the housing 100 can be concealed by a key panel (not shown) when the key panel (not shown) is assembled to cover a keypad recess 112 on the housing front 102 of the housing 100.

The display 200 can be a typical or custom display, such as an LCD or OLED. The display has a display front 202, a display back 204, and display sides 206 that connect between the display front 202 and the display back 204. The display front 202 has a viewing area 208 that illuminates with graphics, letters, and the like. The display 200 has a size and shape corresponding to the display opening 106 so that when assembled with the housing 100, the display 200 fits within the housing 100 between the housing front 102 and the housing back 104 and fills the display opening 106, thereby creating a joint between the front of the housing 102 and the display 200.

The display boot 300 can have a boot front 302, a boot back 304, and boot sides 306 that can connect between the boot front 302 and the boot back 304. The display boot 300 can have a size and shape consistent with the display 200 so that when assembled with the display 200, the display boot 300 can wrap snugly around at least a portion of the display back 204 of the display 200, the display sides 206 of the display 200, and at least a portion of the display front 202 of the display 200, with the boot front 302 of the display boot 300 mating with the display front 202 of the display 200, the boot back 304 of the display boot 300 mating with the display back 204 of the display 200, and the boot sides 306 of the display boot 300 mating with the display sides 206 of the display 200. Alternatively, the display boot 300 can be flat and can cover only a portion of the display front 202 of the display 200. The display boot 300 can extend over the display front 202 of the display 200 a minimal amount at the perimeter of the display front 202 sufficient to retain the display boot 300 in engagement with the display 200 and/or to form a proper seal between the display 200 and the housing 100 while minimizing or preventing obstruction of the viewing area 208 of the display 200. In other words, the boot front 302 of the display boot 300 can define a display opening 308 sized corresponding to the viewing area 208 of the display 200.

The display boot 300 is comprised of a flexible and/or elastic material, capable of conforming to, and configured to conform to, a surface or between two surfaces when compressed. Other openings can be defined in the boot back 304 of the display boot 300 or in the boot sides 306 of the display boot 300 for ventilation, accessing the display 200, passing cables or wires through, etc. Various surfaces of the display boot 300 can also be ridged to allow ventilation of heat, provide better friction, or provide a better seal.

Figure 2:
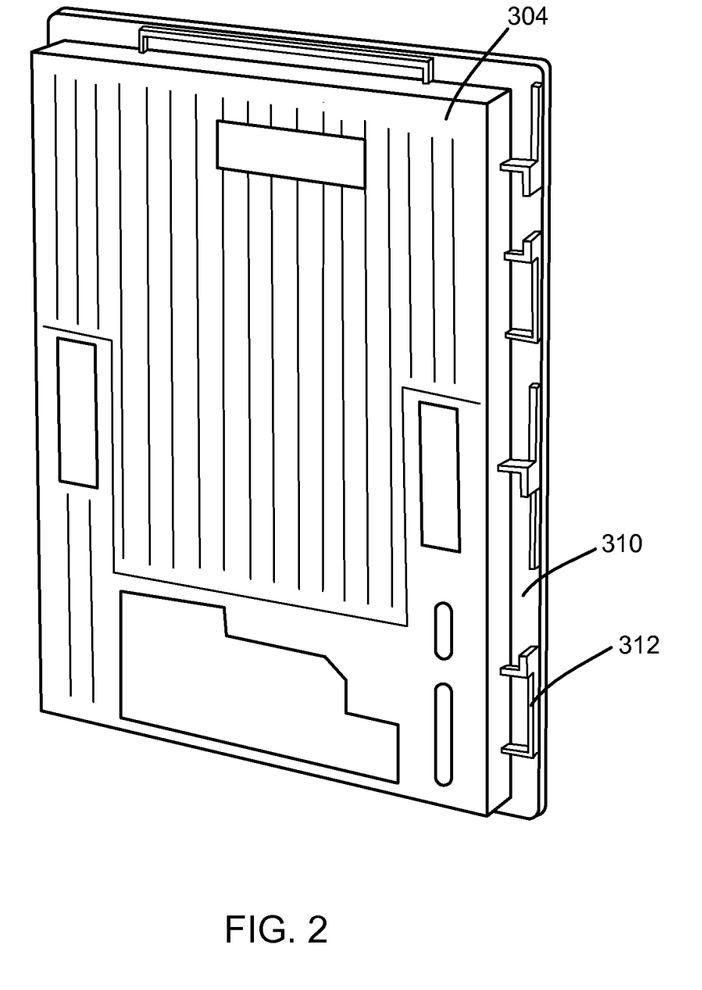
FIG. 2 is an isometric view of the back of the display boot illustrated in FIG. 1.

The boot front 302 of the display boot 300 can have an overhanging portion 310, as illustrated in FIG. 1 and further in FIG. 2, the latter of which is a detailed isometric view of the back of the display boot illustrated in FIG. 1. The overhanging portion 310 can extend from the boot front 302 of the display boot 300 substantially perpendicular to the boot sides 306 of the display boot 300 past the boot sides 306 of the display boot 300. The overhanging portion 310 can have one or more ridges 312 that extend parallel to the boot sides 306 of the display boot 300 in a direction from the boot front 302 toward the boot back 304 of the display boot 300.

The display frame 400 is a rigid casing that can hold the display 200. The display frame can be made from rigid, hard materials, such as rigid plastics or rigid metals. The display frame 400 has a frame front 402, a frame back 404, and frame sides 406. The frame sides 406 can form an outer perimeter that can correspond to the interior perimeter of the housing 100 so that the display frame 400 can fit within the housing 110. The frame front 402 of the display frame 400 can have a recess 408. The recess 408 can have a size and shape corresponding to the display boot 300 so that when assembled with the display 200 and the display boot 300, the display boot 300 fits snuggly, or with an interference fit, within the recess 408. The recess 408 is defined by a perimeter. At one or more of the frame sides 406, the perimeter can be relatively thin spaced from the respective side 406 so as to form a wall bounding the recess 408 at the respective frame side 406. In other words, the recess 408 can extend up to one or more frame sides 406 so that there is minimal distance between the outer surface of the respective frame side 406 and the recess 408. The frame front 402 can also have a non-recessed portion 412 outside the perimeter of the recess 408, between the perimeter and the frame sides 406.

The display frame 400 can have at least one frame hole 410 for fastening the display frame 400 to the housing front 102 of the housing 100 using fasteners, such as but not limited to screws. The number and location of the frame holes 410 located in the display frame 400 correspond to the number and location of housing holes 110 in the housing 100. In the illustrated embodiment, there are five frame holes 410—one frame hole 410 located in each top corner of the display frame 400 around the periphery of the recess 408, and three fastening holes spaced across the frame front 402 of the display frame 400 below the recess 408. The three frame holes 410 positioned across the frame front 402 of the display frame 400 are on an opposite side of the recess 408 from the two frame holes 410 located in the top corners around the periphery of the recess 408. The two fastening holes 410 located in the top corners of the display frame 400 can also be outside the perimeter formed by the frame sides 406.

Figure 3:
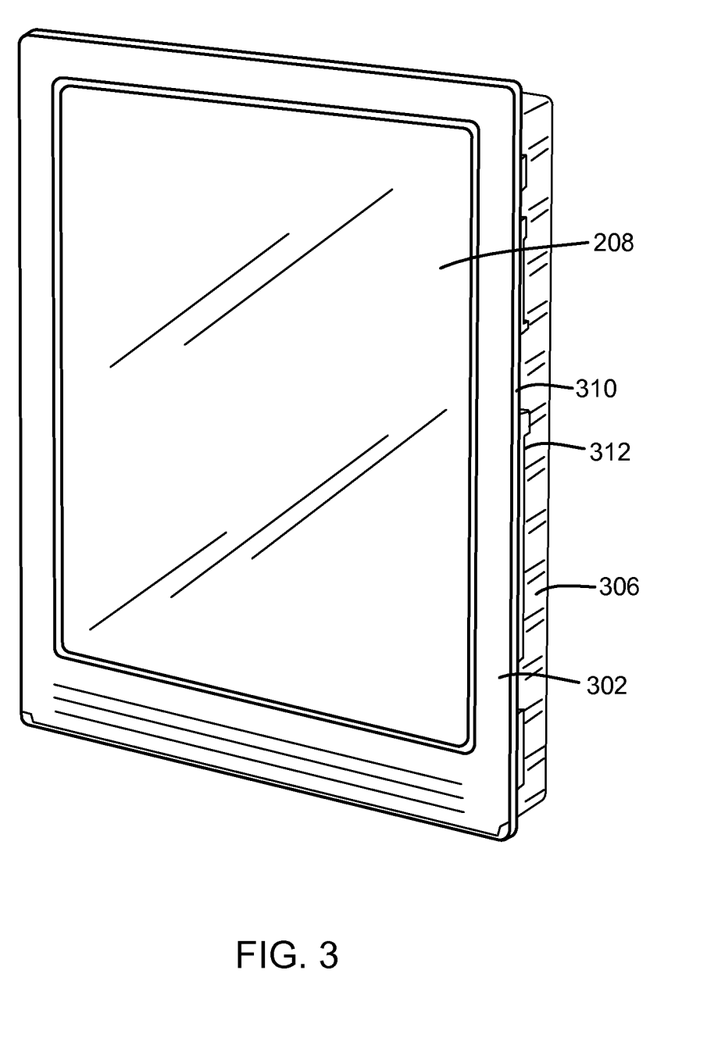
FIG. 3 is an exemplary isometric representation of a display assembled with a display boot, in one embodiment.

To assemble the display 200 with the housing 100 to achieve a strong seal at the joint between the display 200 and the housing 100, the display 200 can be assembled with the display boot 300 and assembled with the display frame 400. FIG. 3 is an exemplary isometric representation of a display 200 assembled with a display boot 300, in one embodiment. Any cords, cables, wires, or other items protruding from the display back 204 or display sides 206 of the display 200 can be inserted through respective openings in the display boot 300. The display boot 300 is flexible and/or elastically deformable so that one display side 206 of the display 200 can be inserted into one boot side 306 of the display boot 300, and the other boot sides 306 of the display boot 300 can be stretched over or around the other display sides 206 of the display 200. The display boot 300 can pull back into shape to fit snuggly around the display 200, as described above, so that at least a portion of the boot front 302 of the display boot 300 can mate with at least a portion of the display front 202 of the display 200, the boot sides 306 of the display boot 300 can mate with the display sides 206 of the display 200, and the boot back 304 of the display boot 300 can mate with the display back 204 of the display 200. When the display boot 300 is assembled with the display 200, the boot front 302 of the display boot 300 can mate with a peripheral portion of the display front 202 of the display 200 so that the viewing area 208 remains unobstructed for viewing. The overhanging portion 310 of the display boot 300 can extend beyond the display sides 206 of the display 200.

Figure 4:
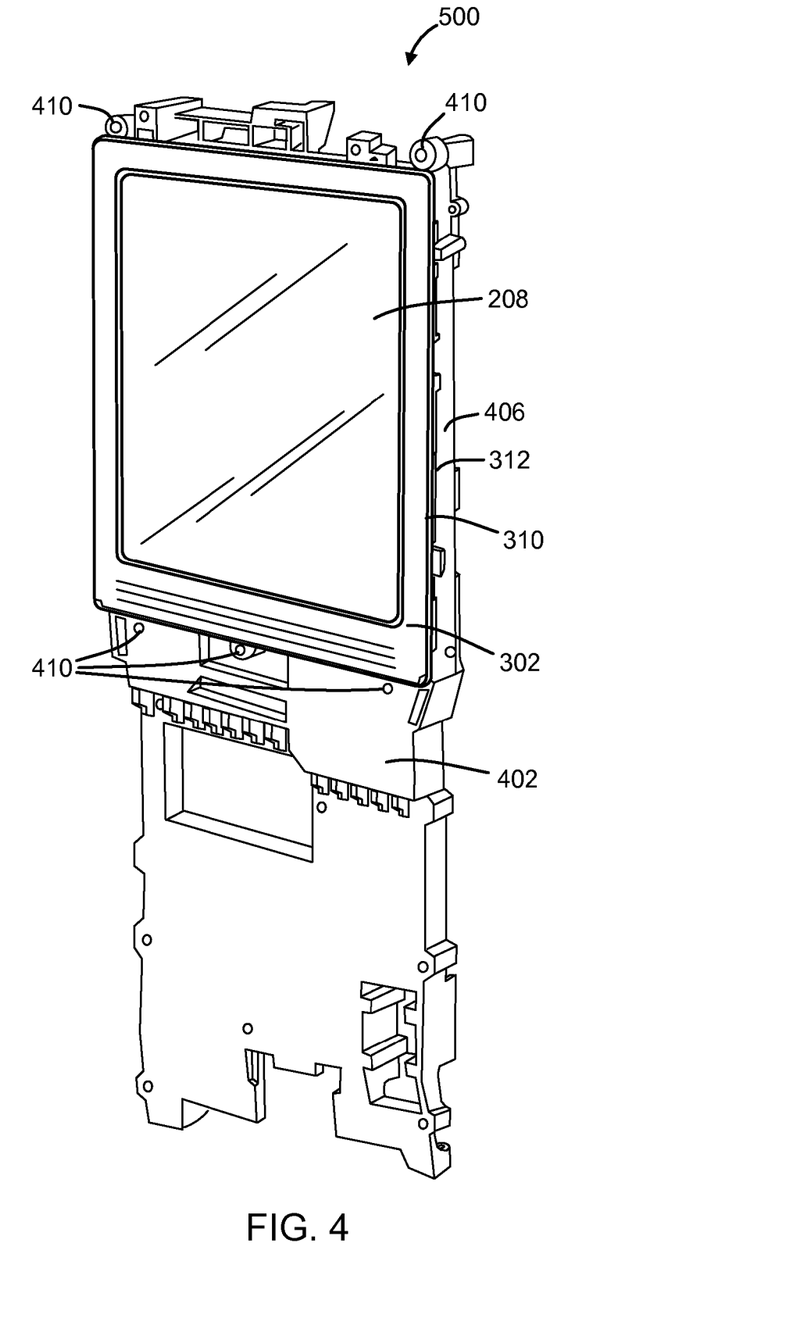
FIG. 4 is an exemplary isometric representation of a display assembled with a display boot and a display frame, in one embodiment.

The assembly of the display 200 and the display boot 300 can be assembled with the display frame 400. FIG. 4 is an exemplary isometric representation of the display 200 assembled with the display boot 300 and the display frame 400. Any cords, cables, wires, or other items protruding from the display back 204 or display sides 206 of the display 200 and/or through the display boot 300 can be inserted through respective openings in the display frame 400. The display 200 and the display boot 300 can be pressed into the recess 408 of the display frame 400. In the illustrated embodiment, the display boot 300 is compressed on the boot sides 306 and/or the boot back 304 as the display boot 300 and the display 200 are inserted into the recess 408 of the display frame 400. The compression of the boot sides 306 and/or the boot back 304 of the display boot 300 facilitate a tight and/or sealed fit of the display 200 in the recess 408. Alternatively, the display boot 300 can be a flat seal, the display 200 can fit in the recess 408, and the display boot 300 can be placed over the display front 202 of the display 200. Further alternatively, the display boot 300 can be omitted or the display boot 300 can be a seal or gasket incorporated directly into the display front 202 of the display 200 or the housing 100.

When the display boot 300 is used, the overhanging portion 310 of the display boot 300 mates against the non-recessed portion 412 of the frame front 402 of the display frame 400. The overhanging portion 310 can extend beyond the display sides 206 of the display 200 and/or the frame sides 406 of the display frame 400, and the ridge(s) 312 that can extend from the overhanging portion 310 can overlap and/or mate with the frame sides 406 of the display frame 400. The assembly of the display 200 with the display frame 400 and/or the assembly of the display 200 with the display boot 300 and the display frame 400 will be hereinafter referred to as a display assembly.

Figure 5:
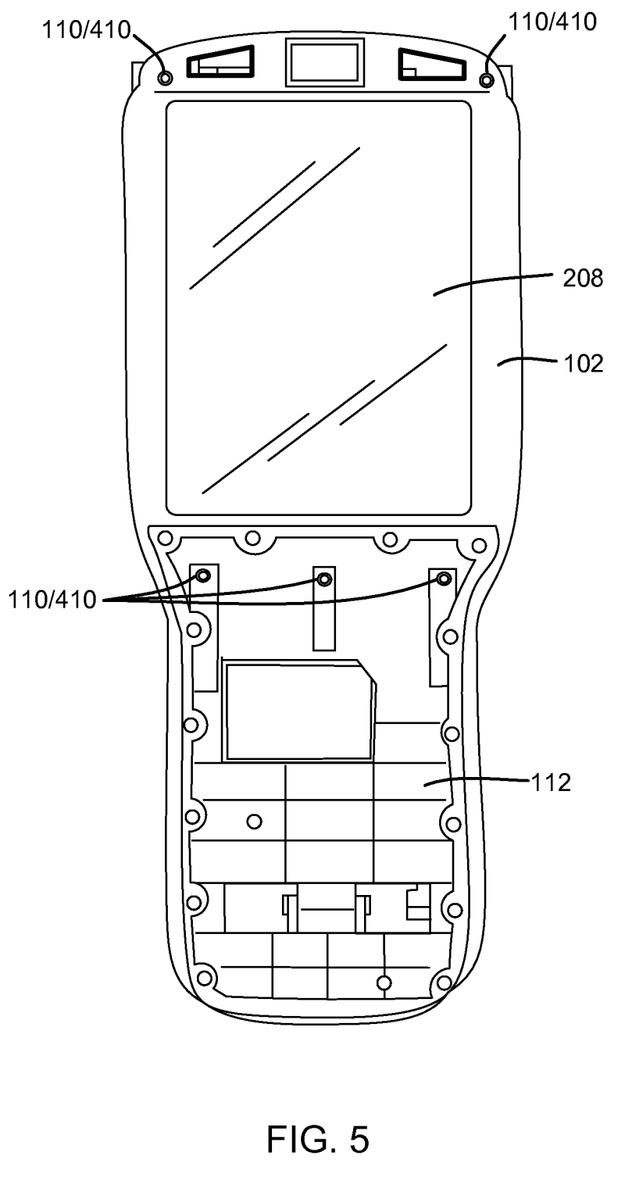
FIG. 5 is an exemplary front view of a housing, a display, a display boot, and a display frame of a hand held computer terminal in an assembled state, in one embodiment.

The display assembly can be assembled into the housing 100. FIG. 5 is an exemplary front view of the display assembly 500 (e.g. the display 200, the display boot 300, and the display frame 400) assembled with the housing 100. To assemble the display assembly 500 into the housing 100, the display assembly 500 can be inserted into the housing 100, such as by sliding the display assembly 500 into the housing 100. The display assembly 500 can fit snugly, with the display front 202 of the display 200 or the boot front 302 of the display boot 300 mating against the interior of the housing front 102 of the housing 100. When fully inserted, the viewing area 208 of the display 200 can be centered in the opening 106 of the housing 100. The frame holes 410 of the display frame 400 can align with the housing holes 110 of the housing. The frame holes 410 of the display frame 400 or the housing holes 110 of the housing 100 can have internal threads to tighten the display frame 400 to the housing 100 to compress the display 200 between the display frame 400 and the housing 100. Other known methods of tightening one object to another can alternatively be used to tighten the display frame 400 to the housing 100.

The compression can facilitate the display 200 and/or the display frame 400 to seal against the housing 100. When the display boot 300 is used, the display boot 300 and the display can be compressed between the display frame 400 and the housing 100. The display boot 300 can be compressed between the display 200 and the housing 100, forming a seal between the display 200 and the housing 100. The display boot 300 can be compressed between the display frame 400, such as the non-recessed portion 412, forming a seal between the display frame 400 and the housing 100.

It will be appreciated that the apparatus and method disclosed herein can be applied to a variety of hand held terminals with a display and a non-clamshell housing, such as a scanner, a digital camera, a cell phone, and a mobile computer.

A small sample of apparatus and methods that are described herein is as follows:

A1. An apparatus for sealing a joint between a display and a housing of a hand held computer terminal, the display having a front, a back, and sides connecting the front and the back, the apparatus comprising:
 a display boot configured to be assembled with the display, at least a portion of the display boot mating with at least a portion of the front of the display; and
 a display frame, the display frame having a recessed portion, a non-recessed portion, and fastening holes, the recessed portion configured to accept insertion of the display and the display boot, the non-recessed portion defining at least a portion of the perimeter of the recessed portion, and the fastening holes positioned outside the perimeter of the recessed portion,
 wherein the display boot has an overhanging portion configured to overlap and mate against the non-recessed portion of the display frame when the display boot is assembled with the display frame, and
 wherein the display frame is configured to tighten to the housing using the fastening holes to compress the display and the display boot between the display frame and the housing, to compress the overhanging portion of the display boot between the non-recessed portion of the display frame and the housing, and to compress the display and the at least a portion of the display boot mating with the at least a portion of the front of the display between the display frame and the housing.

A2. The apparatus of A1 wherein the display boot comprises a front, a back, and sides, the sides connecting between the front and the back, wherein the display is configured to be assembled with the display boot by inserting the display between the front, the back, and the sides of the display boot, and wherein the front of the display boot has an overhanging portion configured to overhang the sides of the display boot when the display boot is assembled with the display.

A3. The apparatus of A1, wherein the size and shape of the display boot is consistent with the size and shape of the display.

A4. The apparatus of A1, wherein the display frame comprises a front, a back, and sides connecting the front and the back, and wherein the display boot comprises a ridge that extends from the overhanging portion and overlaps at least one of the sides of the display frame.

A5. The apparatus of A1, wherein the front of the display is substantially coplanar with the non-recessed portion of the front of the display frame.

A6. The apparatus of A1, wherein the display boot is comprised of a front surface being grooved to facilitate multiple sealing lines against the housing.

B1. An apparatus for sealing a joint between a display and a housing of a hand held computer terminal, the display having a front, a back, and sides connecting the front and the back, the apparatus comprising:
 a display frame comprising a front, a back, and sides, the front of the display frame having a recessed portion and a non-recessed portion, the recessed portion configured to accept insertion of the display, and the non-recessed portion defining at least a portion of the perimeter of the recessed portion,
 wherein the display frame is configured to tighten to the housing and to compress the display between the display frame and the housing.

B2. The apparatus of B1 further comprising:
 a display boot configured to be assembled with the display, at least a portion of the display boot mating with at least a portion of the front of the display, wherein the display boot comprises an overhanging portion overlapping and mating against the non-recessed portion of the display frame when the display frame is assembled with the display boot,
 wherein the recessed portion of the display frame is configured to accept insertion of the display and the display boot, and
 wherein the display frame is configured to tighten to the housing and to compress the overhanging portion of the display boot between the non-recessed portion of the display frame and the housing.

B3. The apparatus of B2, wherein the display frame is configured to tighten to the housing and to compress the display boot between the display and the housing.

B4. The apparatus of B2 wherein the display boot comprises a front, a back, and sides, the sides connecting between the front and the back, wherein the front of the display boot has an overhanging portion extending beyond the sides of the display boot.

B5. The apparatus of B4, wherein the overhanging portion of the display boot overhangs the sides of the display when the display boot is assembled with the display.

B6. The apparatus of B1, wherein the front of the display is substantially coplanar with the non-recessed portion of the front of the display frame.

B7. The apparatus of B2, wherein the size and shape of the display boot is consistent with the size and shape of the display.

B8. The apparatus of B1, wherein the display frame comprises a front, a back, and sides connecting the front and the back, and wherein the display boot comprises a ridge that extends from the overhanging portion and overlaps at least one of the sides of the display frame.

B9. The apparatus of B2, wherein the display boot is comprised of a front surface being grooved to facilitate multiple sealing lines against the housing.

B10. The apparatus of B1, wherein the display frame further comprises fastening holes positioned outside the perimeter of the recessed portion, wherein the display frame is configured to tighten to the housing and to compress the display between the display frame and the housing using the fastening holes.

C1. A method of assembling a display and a housing of a hand held computer terminal, the display comprising a front, back, and sides connecting the front and the back, the method comprising:
 providing a display frame, the display frame comprising a front, the front comprising a recessed portion and a non-recessed portion;
 assembling a display assembly wherein assembling the display assembly comprises inserting the display into the recessed portion of the display frame;
 inserting the display assembly into the housing; and
 compressing the display between the display frame and the housing.

C2. The method of C1, wherein assembling the display assembly further comprises:
 providing a display boot; and
 assembling the display boot with the display and the display frame, wherein a portion of the display boot is placed over a portion of the front of the display, and wherein a portion of the display boot is placed over a portion of the non-recessed portion of the display frame.

C3. The method of C1, wherein compressing the display between the display frame and the housing comprises:
 compressing the display boot between the display and the housing; and compressing the display boot between the display frame and the housing.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. An apparatus, comprising:
a display boot configured to be assembled with a display, the display having a display front, a display back, and display sides connecting the display front and the display back, wherein at least a portion of the display boot mates with at least a portion of the front of the display when assembled;
a display frame comprising a recessed portion, a non-recessed portion, and frame holes, the recessed portion configured to accept insertion of the display and the display boot, the non-recessed portion defining at least a portion of a perimeter of the recessed portion, and the frame holes positioned outside the perimeter of the recessed portion; and
wherein the display boot comprises an overhanging portion configured to overlap and mate against the non-recessed portion of the display frame when the display boot is assembled with the display frame; and
wherein the display frame is configured to:
tighten to a housing using the frame holes to compress the display and the display boot between the display frame and the housing;
compress the overhanging portion of the display boot between the non-recessed portion of the display frame and the housing; and
compress the display and the at least a portion of the display boot mating with the at least a portion of the front of the display between the display frame and the housing.

2. The apparatus of claim 1, wherein:
the display boot comprises a boot front, a boot back, and boot sides, the sides connecting between the front and the back;
the display is configured to be assembled with the display boot by inserting the display between the boot front, the boot back, and the boot sides; and
the boot front has an overhanging portion configured to overhang the display sides when the display boot is assembled with the display.

3. The apparatus of claim 1, wherein:
the display frame comprises a frame front, a frame back, and frame sides connecting the frame front and the frame back; and
the display boot comprises a ridge that extends from the overhanging portion and overlaps at least one of the frame sides of the display frame.

4. The apparatus of claim 1, wherein the non-recessed portion of the frame front is coplanar with the display front.

5. The apparatus of claim 1, wherein the display boot comprises a front surface being grooved to facilitate multiple sealing lines against the housing.

6. The apparatus of claim 1, wherein:
the display boot comprises a boot front, a boot back, and boot sides, the sides connecting between the front and the back; and
the overhanging portion extends perpendicularly from the boot sides.

7. An apparatus, comprising:
a display frame comprising a frame front, a frame back, and frame sides, the frame front having a recessed portion and a non-recessed portion, the recessed portion configured to accept insertion of a display, and the non-recessed portion defining at least a portion of a perimeter of the recessed portion; and
a display boot comprising an overhanging portion configured to overlap and mate against the non-recessed portion of the display frame;
wherein the display frame is configured to tighten to a housing and to compress the overhanging portion of the display boot between the display frame and the housing.

8. The apparatus of claim 7, wherein:
the display boot is configured to be assembled with the display such that at least a portion of the display boot mates with at least a portion of a display front of the display when assembled;
the recessed portion of the display frame is configured to accept insertion of the display and the display boot; and
the display frame is configured to tighten to the housing and to compress the overhanging portion of the display boot between the non-recessed portion of the display frame and the housing.

9. The apparatus of claim 8, wherein the display frame is configured to tighten to the housing and to compress the display boot between the display and the housing.

10. The apparatus of claim 8, wherein:
the display boot comprises a boot front, a boot back, and boot sides, the boot sides connecting between the boot front and the boot back; and
the boot front comprises the overhanging portion extending beyond the boot sides.

11. The apparatus of claim 10, wherein the overhanging portion overhangs the display sides when the display boot is assembled with the display.

12. The apparatus of claim 7, wherein the non-recessed portion of the frame front is coplanar with a display front of the display.

13. The apparatus of claim 8, wherein a size and shape of the display boot is consistent with the size and shape of the display.

14. The apparatus of claim 7, wherein:
the frame sides connect the frame front and the frame back; and
the display boot comprises a ridge that extends from the overhanging portion and overlaps at least one of the frame sides.

15. The apparatus of claim 8, wherein the display boot comprises a front surface being grooved to facilitate multiple sealing lines against the housing.

16. The apparatus of claim 7, wherein:
the display frame comprises frame holes positioned outside the perimeter of the recessed portion; and
the display frame is configured to tighten to the housing and to compress the display between the display frame and the housing using the frame holes.

17. The apparatus of claim 7, wherein:
- the display boot comprises a boot front, a boot back, and boot sides, the sides connecting between the front and the back; and
- the overhanging portion extends perpendicularly from the boot sides.

18. A method, comprising:
- providing a display frame comprising a frame front, the frame front comprising a recessed portion and a non-recessed portion;
- providing a display boot comprising an overhanging portion configured to overlap and mate against the non-recessed portion of the display frame;
- inserting a display into the display boot with the overhanging portion overlapping the non-recessed portion of the display frame to form a display assembly;
- inserting the display assembly into a housing; and
- compressing the display between the display frame and the housing.

19. The method of claim 18, wherein compressing the display between the display frame and the housing comprises:
- compressing the display boot between the display and the housing; and
- compressing the display boot between the display frame and the housing.

20. The method of claim 18, wherein the overhanging portion perpendicularly overlaps the non-recessed portion of the display frame.

* * * * *